Jan. 11, 1949.  J. A. AXELSSON  2,458,824
CHUCK
Filed March 14, 1945  2 Sheets-Sheet 2
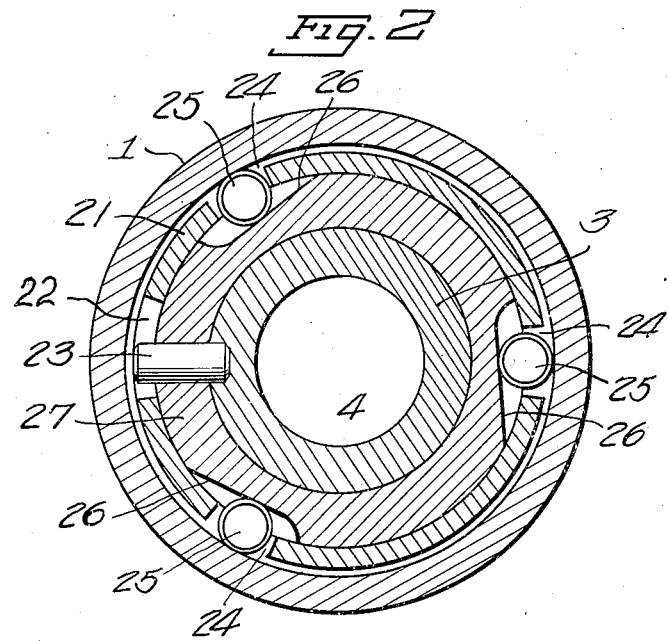
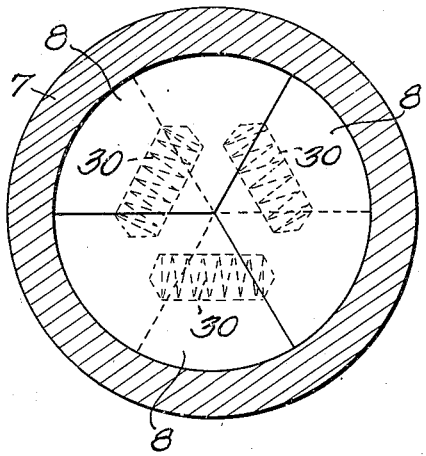
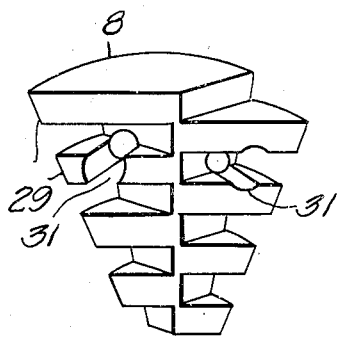
Inventor
JOHAN A. AXELSSON
By Young, Emery + Thompson
Attorneys Patented Jan. 11, 1949

2,458,824

UNITED STATES PATENT OFFICE 2,458,824

CHUCK

Johan Arvid Axelsson, Eskilstuna, Sweden, assignor to Aktiebolaget Fr. Ramström, Stockholm, Sweden, a corporation of Sweden Application March 14, 1945, Serial No. 582,652
In Sweden June 1, 1942

3 Claims. (Cl. 279—64)

The present invention relates to chucks and has for its principal object the provision of new and improved form and arrangement of means by the use of which a drill or other tool may be quickly and conveniently locked in an operative position in the chuck and also removed from the same while the chuck is rotating.

The chuck according to the invention is of the general type which comprises a central threaded body member upon which is screwed a threaded chuck sleeve having a tapering lower end which surrounds a number of chuck jaws adapted to be closed when the chuck sleeve is moved in one direction on the central body member and to be opened when the chuck sleeve is moved in the opposite direction, the chuck sleeve being adapted to move automatically to the position corresponding to open jaws. The most prominent feature of the present invention is that a spring-actuated locking means is provided which automatically locks the chuck sleeve in its adjusted position on the central threaded body member, said locking means being operatively connected to a release member which, when subjected to a braking action during the rotation of the chuck, releases the chuck sleeve so that the same is allowed to move to the position corresponding to open jaws.

For the explanation of the present invention reference is had to the accompanying drawings which, as an example, illustrate a preferred embodiment of the new chuck, and wherein—

Fig. 2 is a cross section taken on line II—II of Fig. 1;

Fig. 3 is a cross section taken on line III—III of Fig. 1, and

Fig. 4 is a perspective view showing one of the chuck jaws.

Figure 1:
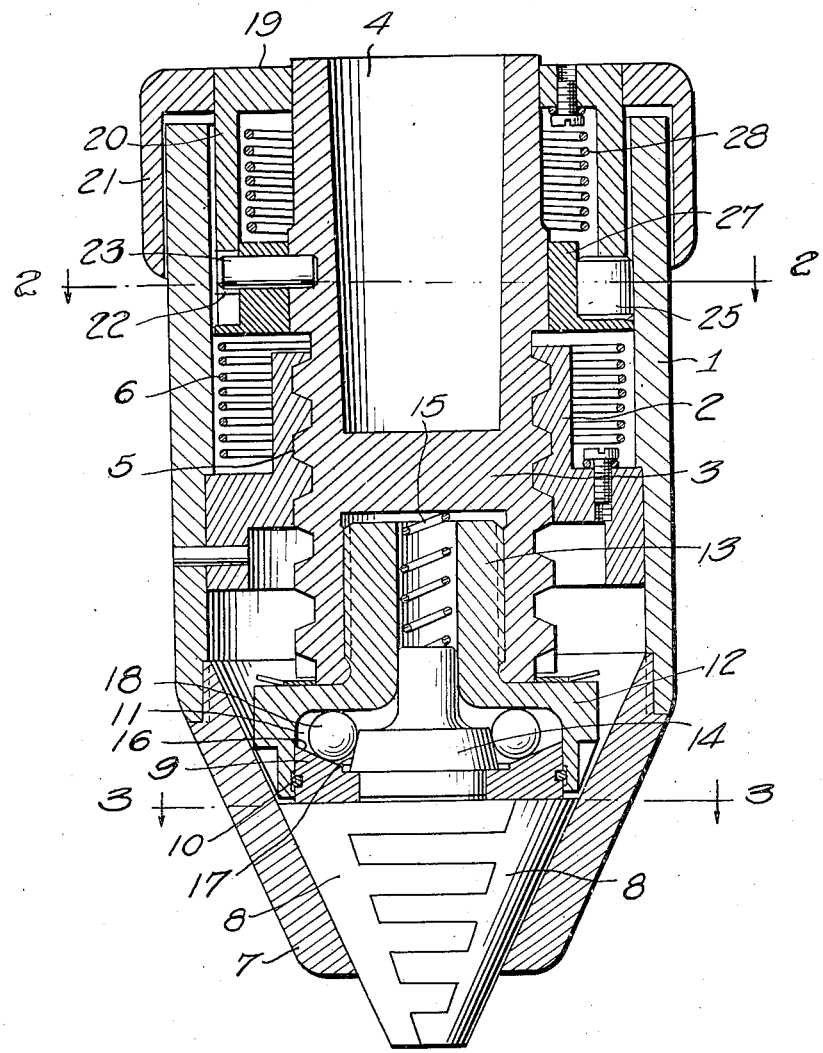
Fig. 1 is a longitudinal axial section of the chuck.

In the drawings 1 designates a cylindrical sleeve which interiorly carries a nut 2. The nut 2 turns upon a central threaded body member 3 in the upper end of which there is provided a slightly conical bore 4 for receiving the spindle of a drilling or other machine with which the chuck is to be used. The thread 5 of the body member 3 is of a rather high pitch and between the nut 2 and the central body member 3 a helical spring 6 is inserted which is secured to the elements 2 and 3 at its ends and acts as a combined torsion and pressure spring which tends to move the nut 2 downwards on the body member 3. The spring 6 may also be replaced by a simple pressure spring or even be dispensed with if the chuck is to be used in a vertical position and if the pitch of the thread 5 is sufficiently high to permit the nut 2 together with the sleeve 1 to descend under the influence of the gravity alone. To the lower end of the cylindrical chuck sleeve 1 a conical sleeve or seat 7 is attached in which three chuck jaws 8 are arranged. A pressure ring 9 rests against the upper surfaces of the chuck jaws, said ring being guided in a cylindrical cavity 11 in a disc-shaped member 12 and retained therein by means of a lock spring 10 in such a way as to be axially movable in the cavity to some extent. The disc-shaped member 12 is provided with an upwardly extending threaded shank 13 which is screwed into a threaded bore in the lower end of the central body member 3. The shank 13 has an axial bore in which the stem of a valve-shaped member 14 slides, and a helical spring 15 is seated between said stem and the central body member 3 which spring tends to move the member 14 downwards so that its head is in contact with the pressure ring 9.

The upper surface of 16 of the pressure ring 9 and the outer edge 17 of the head of the member 14 are slightly conical and bear against a row of balls 18 arranged within the cavity 11. At the upper end of the chuck a ring member 19 is arranged, this ring member being provided with two downwardly extending concentric flanges 20 and 21, respectively, between which the upper end of the chuck sleeve 1 engages. The ring member 19 is capable of a limited rotational movement with respect to the central body member 3 by being provided with a slot 22 into which a pin 23 secured to the central body member 3 extends. At the lower end of the inner flange 20 of the ring member 19 and spaced 120° apart three recesses 24 are made each of which embraces a roller 25 or other suitable body of rotation which rolls on the inner cylindrical surface of the chuck sleeve 1 and is disposed in a corresponding pocket 26 provided in a ring 27 which is secured to the central body member 3. From Fig. 2 it will be seen that the pockets 26 are shaped in such a way that the depth of the same gradually decreases in a clock-wise direction. The ring member 19 is actuated by a torsion spring 28 which tends to rotate the same in a clock-wise direction as viewed in Fig. 2 whereby the rollers 25 are moved towards the shallowest portion of their pockets 26 thus automatically locking the chuck sleeve 1 to the central body member 3 so that the sleeve 1 is firmly retained in any adjusted position upon the member 3.

The chuck jaws 8 are preferably of the shape shown in Figs. 3 and 4, i. e., each jaw is in the form of a half cone having a flat gripping surface and in which recesses are made from opposite sides and in a staggered arrangement so that teeth 29 are formed which engage in the corresponding recesses of the adjacent jaws. By constructing the jaws in this way the same will remain in constant engagement with each other forming a complete triangular opening which at the closing of the jaws effectively guides and centers the drill or other tool to be gripped and prevents the same from taking an inclined position. Between the different pairs of chuck jaws 8 helical springs 30 are arranged which tend to separate the jaws. For the accommodation of these springs each jaw is provided with two bores 31, as shown in Fig. 4.

The mode of operation of the chuck is as follows:

When the chuck is mounted on a machine spindle rotating in a clock-wise direction and the ring member 19, hereinafter referred to as the release ring, is braked by hand, the rollers 25 are moved towards the deepest portion of their pockets 26 whereby the locking action of the rollers ceases and the chuck sleeve is released and quickly descends to its lowermost position on the central body member 3 under the action of the spring 6. Simultaneously the chuck jaws 8 are expanded by their springs 30 so as to form a triangular opening of maximum size. A drill or other tool may now be inserted into this opening whereupon a braking action is exerted upon the chuck sleeve 1. This causes the sleeve 1 to be screwed upwards on the central body member 3 and the jaws to be closed for gripping the tool. After the tool has been gripped the rollers 25 immediately lock the chuck sleeve 1 in the position to which it has been moved.

When working with the drill or other tool the upper end thereof exerts a pressure upon the axially movable member 14. This causes the member 14 to be moved slightly upwards so that the balls 18 in the cavity 11 are forced outwards by the conical edge 17 and, in turn, exert a downwardly directed pressure upon the ring 9 by means of the conical surface 16 of the latter thus urging the chuck jaws 8 more strongly against the tool and intensifying the gripping action of the same. Since at the separation of the chuck jaws for gripping a tool the jaws will take a position higher up in the conical sleeve 7 the outer conical surface of each jaw will be in contact with said sleeve along a line only. Due to the frictional forces which arise between the gripped tool and the inner surfaces of the chuck jaws when working with the tool the jaws will be turned slightly whereby the gripping action of the same is increased. Though in Fig. 4 the inner surface of each chuck jaw is shown to be flat other forms are also within the scope of the invention, such as slightly concave or convex forms.

What I claim is:

1. In a chuck, a central body member provided with a right hand thread, a chuck sleeve rotatably mounted on said threaded body member and having a tapering end portion, a number of chuck jaws arranged in said tapering end portion and adapted to be closed when the chuck sleeve is moved in one direction on said central body member and to be opened when the chuck sleeve is moved in the opposite direction which last-mentioned movement is adapted to occur automatically, a spring-actuated locking means for automatically locking the chuck sleeve in an adjusted position on said central body member, said locking means comprising a number of bodies of rotation mounted in tapering pockets between said chuck sleeve and said central body member, a carrier member rotatably mounted with respect to the central body member and adapted to embrace said bodies of rotation, a manually operable ring member connected to said carrier member, and a torsion spring adapted to actuate said ring member and said carrier member and to turn the same in a direction for moving the bodies of rotation to the shallowest portion of their pockets for automatically locking said chuck sleeve to said central body member.

2. A chuck as claimed in claim 1, wherein the rotary movement of the carrier member and the ring member with respect to central body member is limited by abutments.

3. In a chuck, a central body member provided with a right hand thread, a chuck sleeve rotatably mounted on said threaded body member and having a tapering end portion, a number of chuck jaws arranged within said tapering end portion and adapted to be closed when the chuck sleeve is moved in one direction upon said central body member and to be opened when said chuck sleeve is moved in the opposite direction, means for automatically moving the chuck sleeve to the position corresponding to open jaws, a spring-actuated locking means for automatically locking the chuck sleeve in an adjusted position on said central body member, a manually operable member operatively connected to said locking means for releasing said chuck sleeve for permitting the same to move to the position corresponding to open jaws, a pressure ring bearing against the upper surfaces of said chuck jaws, an abutment member mounted for axial movement in said chuck and adapted to take up the working pressure of a tool inserted between the chuck jaws, said pressure ring and said abutment member being provided with inclined surfaces, and a row of bodies of rotation adapted to coact with the said inclined surfaces for converting the working pressure of the tool into an increased gripping pressure of the chuck jaws.

JOHAN ARVID AXELSSON.

REFERENCES CITED

The following references are of record in the file of this patent:

UNITED STATES PATENTS

| Number | Name | Date |
|---|---|---|
| 1,705,275 | Von Neudeck | Mar. 12, 1929 |
| 1,748,511 | Johnson | Feb. 25, 1930 |
| 1,750,023 | Prigan | Mar. 11, 1930 |
| 1,985,586 | Stone | Dec. 25, 1934 |

FOREIGN PATENTS

| Number | Country | Date |
|---|---|---|
| 456,492 | Germany | 1928 |
| 32,934 | Denmark | Aug. 2, 1922 |
| 177,305 | Great Britain | Mar. 30, 1922 |